US008850029B2

(12) United States Patent
Melnyk et al.

(10) Patent No.: US 8,850,029 B2
(45) Date of Patent: Sep. 30, 2014

(54) SYSTEM, METHOD, AND COMPUTER PROGRAM PRODUCT FOR MANAGING AT LEAST ONE ASPECT OF A CONNECTION BASED ON APPLICATION BEHAVIOR

(75) Inventors: Mykhaylo Melnyk, Kitchener (CA); Justin A. Mathews, Waterloo (CA)

(73) Assignee: McAfee, Inc., Santa Clara, CA (US)

( * ) Notice: Subject to any disclaimer, the term of this patent is extended or adjusted under 35 U.S.C. 154(b) by 648 days.

(21) Appl. No.: 12/031,488

(22) Filed: Feb. 14, 2008

(65) Prior Publication Data
US 2013/0246628 A1 Sep. 19, 2013

(51) Int. Cl.
*G06F 15/16* (2006.01)
*G06F 15/173* (2006.01)
*H04L 29/08* (2006.01)

(52) U.S. Cl.
CPC .......... *H04L 67/104* (2013.01); *H04L 67/1055* (2013.01)
USPC ............. 709/227; 709/224; 709/229; 726/22; 726/23

(58) Field of Classification Search
CPC ............ H04L 67/104; H04L 2463/141; H04L 63/1425; H04L 67/1055
USPC .................. 709/223–235, 203–206; 370/352; 726/11–13, 22–25, 16
See application file for complete search history.

(56) References Cited

U.S. PATENT DOCUMENTS

| 5,987,610 | A | 11/1999 | Franczek et al. | |
|---|---|---|---|---|
| 6,073,142 | A | 6/2000 | Geiger et al. | |
| 6,424,624 | B1 * | 7/2002 | Galand et al. | 370/231 |
| 6,460,050 | B1 | 10/2002 | Pace et al. | |
| 6,654,814 | B1 * | 11/2003 | Britton et al. | 709/246 |
| 6,816,910 | B1 * | 11/2004 | Ricciulli | 709/237 |
| 6,832,255 | B1 * | 12/2004 | Rumsewicz et al. | 709/227 |
| 6,851,062 | B2 * | 2/2005 | Hartmann et al. | 726/22 |
| 7,089,290 | B2 * | 8/2006 | Hennessey et al. | 709/213 |
| 7,143,180 | B2 * | 11/2006 | Chaar et al. | 709/235 |
| 7,296,288 | B1 * | 11/2007 | Hill et al. | 726/2 |
| 7,383,339 | B1 * | 6/2008 | Meenan et al. | 709/227 |
| 7,385,986 | B2 * | 6/2008 | Ono et al. | 370/395.4 |
| 7,506,155 | B1 | 3/2009 | Stewart et al. | |
| 7,545,748 | B1 * | 6/2009 | Riddle | 370/235 |
| 7,552,206 | B2 * | 6/2009 | Nikolayev et al. | 709/223 |
| 7,600,047 | B2 * | 10/2009 | Tanaka | 709/250 |
| 7,633,944 | B1 * | 12/2009 | Chang et al. | 370/392 |
| 7,774,492 | B2 * | 8/2010 | Raphel et al. | 709/235 |
| 7,840,663 | B1 * | 11/2010 | Hinchliffe et al. | 709/224 |
| 7,958,187 | B2 * | 6/2011 | Petry et al. | 709/203 |
| 8,146,133 | B2 * | 3/2012 | Moon et al. | 726/1 |
| 8,291,495 | B1 * | 10/2012 | Burns et al. | 726/23 |

(Continued)

OTHER PUBLICATIONS

Naoum Naoumov and Keith Ross: "Exploiting P2P systems for DDoS attacks", ACM, vol. 152, 2006, Proceedings of the 1st international conference on Scalable information sytem.*

(Continued)

*Primary Examiner* — Catherine Thiaw
(74) *Attorney, Agent, or Firm* — Patent Capital Group (57) ABSTRACT

A system, method, and computer program product are provided for managing at least one aspect of a connection based on application behavior. In use, a connection request is received from an application. Additionally, a behavior of the application is identified. Furthermore, at least one aspect of a connection made in response to the connection request is managed, based on the behavior.

20 Claims, 6 Drawing Sheets

(56) References Cited

U.S. PATENT DOCUMENTS

| | | | |
|---|---|---|---|
| 8,312,120 B2* | 11/2012 | Ram et al. | 709/223 |
| 2002/0010783 A1* | 1/2002 | Primak et al. | 709/228 |
| 2002/0101819 A1* | 8/2002 | Goldstone | 370/229 |
| 2002/0103916 A1* | 8/2002 | Chen et al. | 709/229 |
| 2002/0174208 A1* | 11/2002 | Morlitz | 709/223 |
| 2003/0037164 A1* | 2/2003 | Chaar et al. | 709/237 |
| 2003/0079031 A1* | 4/2003 | Nagano | 709/229 |
| 2003/0084159 A1* | 5/2003 | Blewett | 709/226 |
| 2003/0145236 A1* | 7/2003 | Tateoka | 713/201 |
| 2004/0083385 A1* | 4/2004 | Ahmed et al. | 713/201 |
| 2004/0153549 A1* | 8/2004 | Naito et al. | 709/228 |
| 2004/0230836 A1* | 11/2004 | Larsen | 713/201 |
| 2004/0243642 A1* | 12/2004 | Irudayaraj et al. | 707/200 |
| 2005/0240940 A1* | 10/2005 | Quinet et al. | 719/315 |
| 2005/0265270 A1* | 12/2005 | Yamato | 370/310 |
| 2006/0031359 A1* | 2/2006 | Clegg et al. | 709/206 |
| 2006/0031520 A1* | 2/2006 | Bedekar et al. | 709/227 |
| 2006/0161667 A1* | 7/2006 | Umesawa et al. | 709/229 |
| 2006/0224673 A1* | 10/2006 | Stern et al. | 709/206 |
| 2006/0225133 A1* | 10/2006 | Balasubramaniyan et al. | 726/22 |
| 2007/0067428 A1* | 3/2007 | Ogawa et al. | 709/223 |
| 2007/0130367 A1* | 6/2007 | Kashyap | 709/245 |
| 2007/0168285 A1* | 7/2007 | Girtakovskis et al. | 705/50 |
| 2007/0220587 A1* | 9/2007 | Loyer | 726/1 |
| 2008/0052774 A1* | 2/2008 | Chesla et al. | 726/13 |
| 2008/0086434 A1* | 4/2008 | Chesla | 706/12 |
| 2008/0133749 A1* | 6/2008 | Sample | 709/224 |
| 2009/0077233 A1* | 3/2009 | Kurebayashi et al. | 709/224 |
| 2009/0094381 A1* | 4/2009 | King et al. | 709/240 |
| 2009/0147698 A1* | 6/2009 | Potvin | 370/254 |
| 2011/0035795 A1* | 2/2011 | Shi | 726/13 |

OTHER PUBLICATIONS

Nancy Marcus, Graphs of Logarithmic Functions, SOS Math, retrieved from http://www.sosmath.com/algebra/logs/log4/log422.html on Nov. 4, 2013.*

Arno Wagner, Thomas Dubendorfer, Lukas Hammerle, Bernhard Plattner, 'Flow-based identification of heavy-hitters', ICISP '06 International Conference on Internet Surveillance and Protection, Aug. 26-26, 2006, IEEE.*

Elizabeth Stapel "Grahing Logarithmic Functions: Exaamples"—Purplemath Forum, 2002-2012 accessed Feb. 7, 2014, at http://www.purplemath.com/modules/graphlog3.htm.*

Yiming Gong "Identifying P2P users using traffic analysis", 2005, Symantec Connect Community, 5 pages.*

Jeffrey Erman, Anirban Mahanti, Mrtin Arlitt, Carey Williamson "Identifying and discriminating between Web and Peer-to-Peer traffic in the network core"—International World Wide Web Conference WWW, May 8-12, 2007 pp. 883-892.*

"Intelligent Traffic Management," Sandvine Incorporated: Peer-to-Peer Policy Management, copyright Sandvine Incorporated 2003-2008, http://www.sandvine.com/solutions/p2p_policy_mngmt.asp.

"Sandvine," Wikipedia, last modified Feb. 13, 2008, http://en.wikipedia.org/wiki/Sandvine.

* cited by examiner

SYSTEM, METHOD, AND COMPUTER PROGRAM PRODUCT FOR MANAGING AT LEAST ONE ASPECT OF A CONNECTION BASED ON APPLICATION BEHAVIOR

FIELD OF THE INVENTION

The present invention relates to proxies, and more particularly to managing connections utilizing proxies.

BACKGROUND

Proxies have traditionally been utilized for managing connections between remote devices. Oftentimes, proxies service connection requests from one device to another remote device. However, conventional techniques utilized by proxies for servicing such connections have exhibited various limitations.

For example, connection requesting devices are generally equipped with timeout capabilities, such that a timeout may occur prior to a connection being made between the connection requesting device and the remote device to which the connection is requested. However, proxies servicing connection requests are many times unaware of the occurrence of a timeout by connection requesting devices, thus resulting in unnecessary usage of system resources during the proxies continuing attempt to provide the connection after the occurrence of the timeout. There is thus a need for overcoming these and/or other issues associated with the prior art.

SUMMARY

A system, method, and computer program product are provided for managing at least one aspect of a connection based on application behavior. In use, a connection request is received from an application. Additionally, a behavior of the application is identified. Furthermore, at least one aspect of a connection made in response to the connection request is managed, based on the behavior.

DETAILED DESCRIPTION

Figure 1:
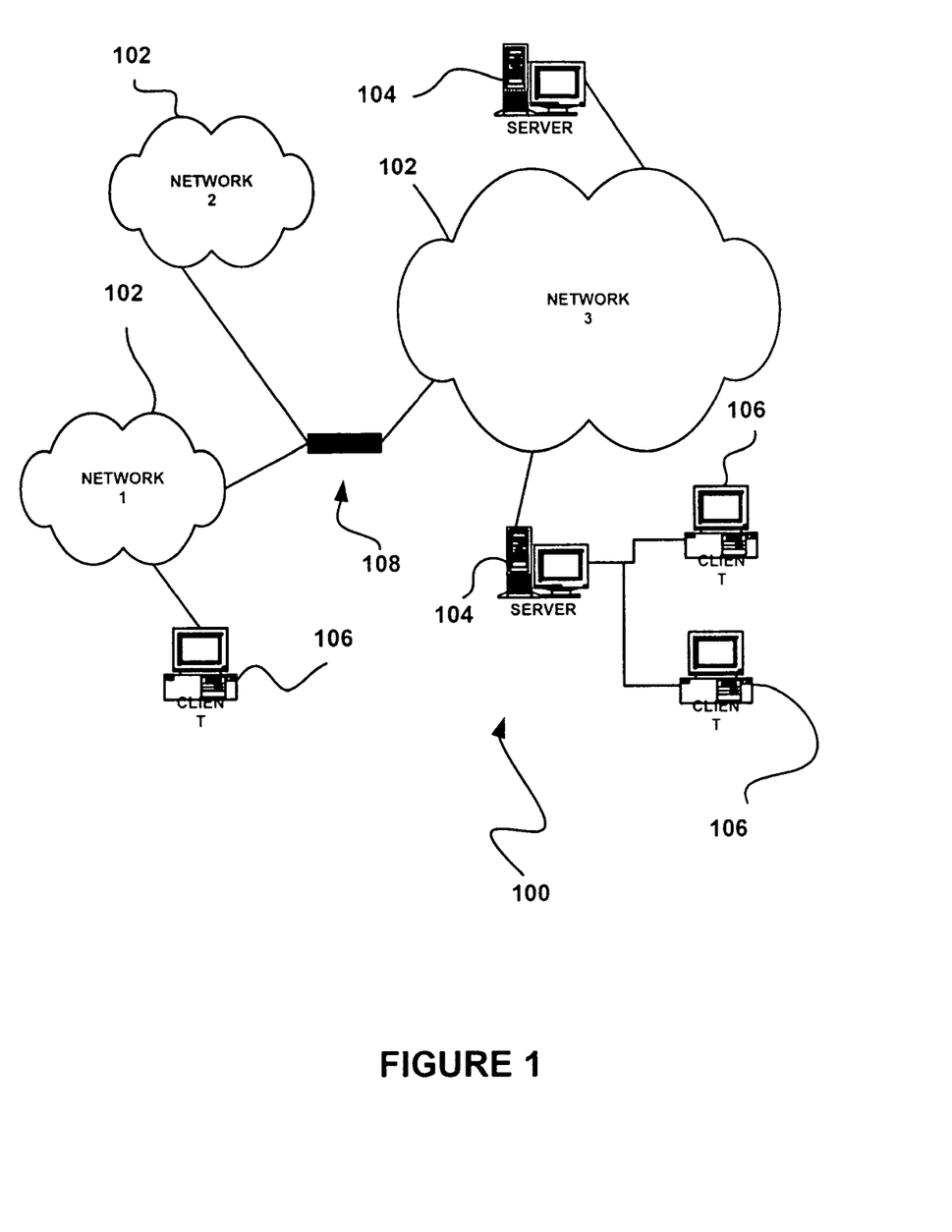
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
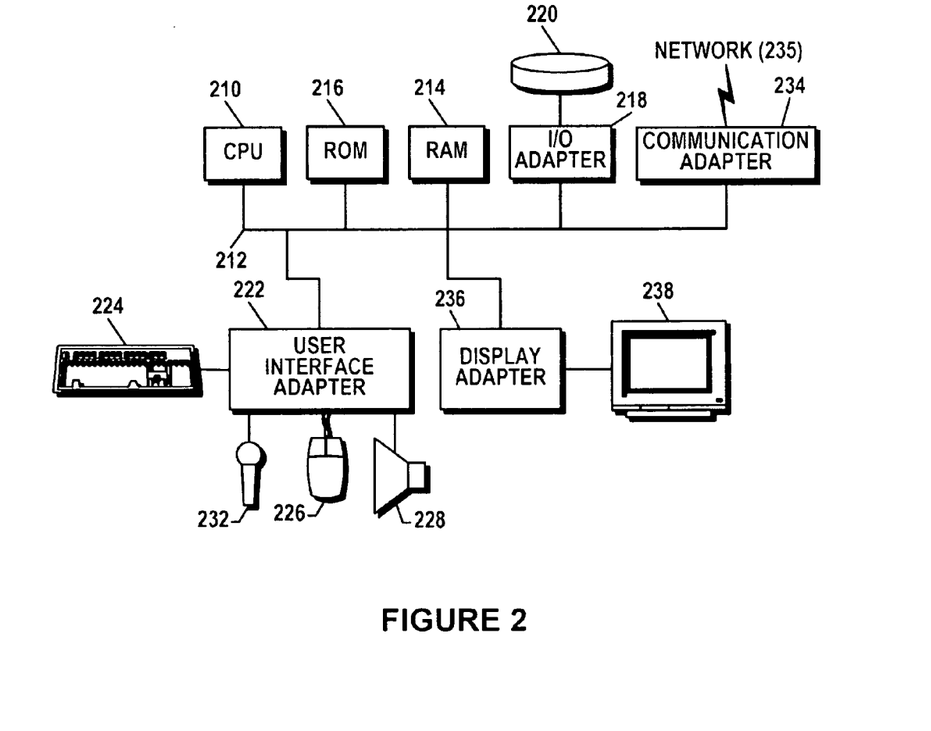
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238. For example, a non-transitory computer readable medium may include the RAM 214, the ROM 216, the disk storage units 220, etc.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
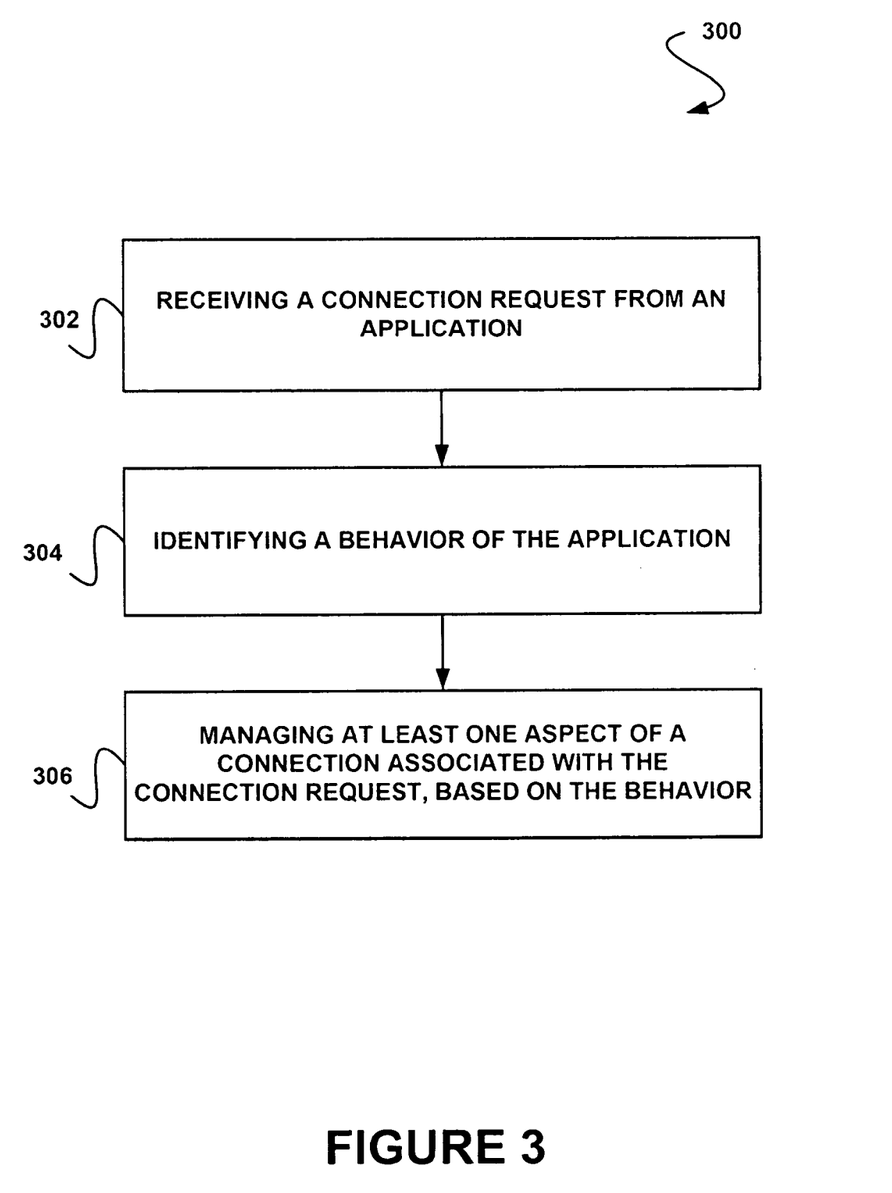
FIG. 3 shows a method for managing at least one aspect of a connection based on application behavior, in accordance with another embodiment.

FIG. 3 shows a method for managing at least one aspect of a connection based on application behavior, in accordance with another embodiment. As an option, the method 300 may be carried out in the context of the architecture and environment of FIGS. 1 and/or 2. Of course, however, the method 300 may be carried out in any desired environment.

As shown in operation 302, a connection request is received from an application. In the context of the present description, the application may include any executing application capable of issuing a connection request. Thus, the application may include a process. For example, the application may include a network process, a peer-to-peer (P2P) process, etc.

Additionally, in one embodiment, the connection request may include a request for a connection to a remote device over a network. In another embodiment, the connection request may include a request for a connection to a port of the remote device. In yet another embodiment, the connection request may include a request to send a data stream to the remote device.

As an option, the connection may be requested for sending, and/or receiving data (e.g. streaming data, web pages, files, etc.) over the network. For example, the application may request the connection for sending data to and/or receiving data from the remote device. Of course, however, the connection request may include any request for a connection.

It should be noted that the remote device may include any device that is remotely located with respect to the application. Just by way of example, remote device may be remote with respect to another device on which the application is located. In various embodiments, the remote device may include any of the devices described above with respect to FIGS. 1 and/or 2.

In one embodiment, the connection request may be received at a proxy. The proxy may optionally include a device intermediately located with respect to the application and the remote device. Just by way of example, the proxy may be located on at a gateway device. As another option, the proxy may be utilized for providing connections between applications and devices to which such applications request to connect. As yet another option, the proxy may include a transparent proxy (e.g. a proxy to which the connection request is automatically redirected from the remote device, etc.). Of course, as another option, the proxy may be a component of a device running the application.

Further, as shown in operation 304, a behavior of the application is identified. With respect to the present description, the behavior may include any activity associated with the application. For example, the activity may include requests made by the application, data sent by the application, etc.

In one embodiment, the behavior may reflect a number of connection requests received from the application. For example, the number of connection requests may include those received by the proxy. In another embodiment, the behavior may reflect a number of connection requests received from the application over a predetermined time period. The predetermined time period may be user-configured, for example.

The behavior of the application may optionally indicate a type of the application. Just by way of example, the behavior of the application may indicate whether the application is a P2P application, a network application, etc. In one embodiment, the application may be determined to be a P2P application if the number of connection requests received exceeds a predetermined threshold.

In addition, the behavior of the application may be identified in any desired manner. As an option, the behavior of the application may be identified utilizing the proxy. Just by way of example, the proxy may count the number of connection requests received from the application. As another option, the behavior of the application may be identified by a module that monitors activity of the application.

Still yet, as shown in operation 306, at least one aspect of a connection associated with the connection request is managed, based on the behavior. In one embodiment, the connection associated with the connection request may include the connection requested by the application. For example, the connection may include a connection at least attempted to be made to the remote device over the network. As another example, the connection may be attempted by the proxy.

Moreover, the aspect of the connection associated with the connection request may include any feature of the connection. In one embodiment, the aspect of the connection associated with the connection request may include a timeout value utilized in conjunction with such connection. As an option, the timeout value may be utilized for determining a time period in which the connection is to be attempted. As another option, the timeout value may be utilized by the proxy. Thus, the aspect of the connection may be managed such that in response to an occurrence of the timeout, the connection attempt may optionally be terminated.

In another embodiment, the aspect of the connection associated with the connection request may include a priority of the connection. For example, resources (e.g. memory, bandwidth, etc.) may be provided for establishing the connection based on the priority of the connection. To this end, the aspect of the connection may be managed such that connections with a higher priority may be attempted prior to connections with a lower priority, as an option.

Additionally, the managed aspect of the connection may be based on the behavior in any desired manner. In one embodiment, if the behavior indicates that the number of connection requests received from the application (e.g. over a predetermined period of time, etc.) exceed a predetermined threshold, the timeout value utilized in conjunction with such connection may be reduced. Accordingly, applications requesting more connections (e.g. P2P applications) may have a shorter timeout value for such connections than application requesting fewer connections.

In another embodiment, the timeout value may be modified in relation to the behavior. Just by way of example, the timeout value may be modified as a function of the behavior. Thus, as an option, for each connection request received by the application, the timeout value may be proportionately decreased.

In yet another embodiment, a rank may be associated with the application based on the behavior. The rank may reflect the number of connection requests received from the application (e.g. over a predetermined period of time, etc.), for example. To this end, the aspect of the connection may be managed based on the rank.

As an option, the rank may be modified over time. For example, the rank may be decremented after each passing of a predetermined time internal. As another example, the rank may be incremented after each receipt of a subsequent connection request from the application. To this end, at least one aspect of a subsequent connection may optionally be managed based on the modified rank.

In still yet another embodiment, if the behavior indicates that the number of connection requests received from the application exceeds a predetermined threshold, a priority of the connection requested may be reduced. Just by way of example, if the behavior indicates that the number of connection requests received from the application indicates that the application is a P2P application, the priority of the connection requested may be reduced. Thus, the aspect of the connection may be managed for preventing unwanted ramifications of a P2P application, such as resource (e.g. port, etc.) consumption, unstable network access, etc.

If, however, the behavior indicates that the number of connection requests received from the application indicates that the application is not a P2P application (e.g. is an electronic mail (email) message application, a voice over internet protocol (VoIP) application, etc.), the priority of the connection requested may be maintained or optionally increased.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
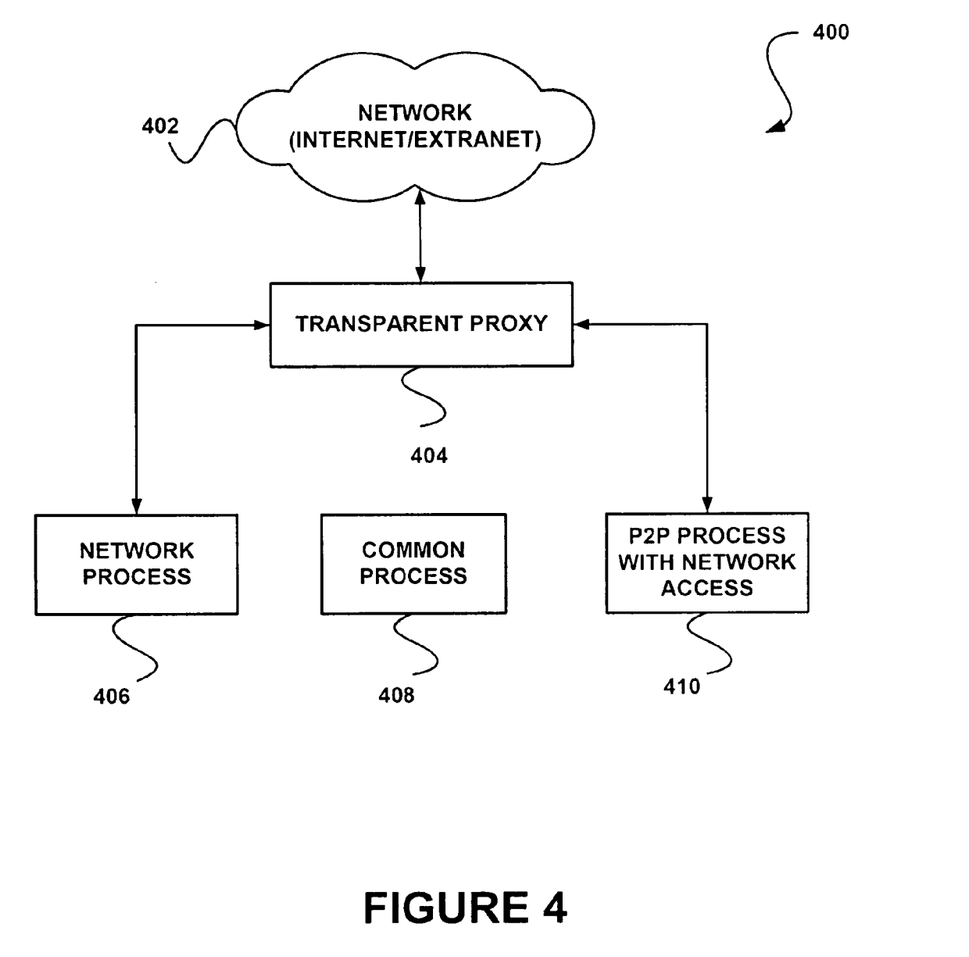
FIG. 4 shows a system for managing at least one aspect of a connection based on application behavior, in accordance with yet another embodiment.

FIG. 4 shows a system 400 for managing at least one aspect of a connection based on application behavior, in accordance with yet another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a transparent proxy 404 is in communication with a network 402. The network 402 may include the Internet, extranet, etc. For example, the network 402 may include any of the networks described above with respect to FIG. 1. In the context of the present embodiment, the network 402 may be in communication with at least one remote device (not shown).

Additionally, the transparent proxy 404 may include any proxy utilized for managing connection requests received from at least some of the processes 406-410. In one embodiment, the transparent proxy 404 may provide a connection between any of the processes 406-410 and a remote device via the network 402. For example, such connection may be provided via the transparent proxy 404 automatically (e.g. without a pre-configuration of the processes 406-410 to utilize such transparent proxy 404, etc.).

As an option, the transparent proxy 404 may be located on a gateway device. For example, the gateway device may allow communication between at least some of the processes 406-410 and the network 402. As another option, the processes 406-410 may be located within another network (not shown) separate from the network 402 with which the transparent proxy 404 is in communication. Thus, the gateway device may optionally allow communication between the network 402 and the other network on which the processes 406-410 are located.

The processes 406-410 may each be associated with a different application, in one embodiment. As shown, a network process 406 is in communication with the network 402 via the transparent proxy 404. The network process 406 may include any process that utilizes the network 402. Just by way of example, the network process 406 may include a web browser, a new reader, a VoIP process, etc.

In addition, a P2P process 410 is also in communication with the network 402 via the transparent proxy 404. The P2P process 410 may include a process that uses P2P techniques for sending and/or receiving data over the network 402. Thus, the P2P process 410 may optionally include a specific type of network process. However, as also shown, the common process 408 may include any process that is not in communication with the network 402 via the transparent proxy 404.

In one embodiment, the transparent proxy 404 may receive connection requests from the network process 406 and the P2P process 410. Such connection requests may include requests to connect to a remote device over the network 402. As an option, the transparent proxy 404 may intercept connection requests issued by the network process 406 and the P2P process 410 which are directed to the network 402.

In response to receipt of the connection requests, the transparent proxy 404 may identify a behavior of each of the network process 406 and the P2P process 410. In one embodiment, the transparent proxy 404 may identify the behavior by counting a number of connection requests received from each of the network process 406 and the P2P process 410 (e.g. within a predetermined time period, etc.). As an option, the transparent proxy 404 may receive fewer connection requests from the network process 406 than that received from P2P process 410.

Moreover, based on the behavior of each of the network process 406 and the P2P process 410, the transparent proxy 404 may manage at least one aspect of a connection associated with each of the connection requests received from the network process 406 and the P2P process 410. Just by way of example, a connection attempted to be made to a remote device by the transparent proxy 404 in response to the connection request received from the network process 406 may be managed based on the behavior of the network process 406. Similarly, a connection attempted to be made to a remote device by the transparent proxy 404 in response to the connection request received from the P2P process 410 may be managed based on the behavior of the P2P process 410. The transparent proxy 404 may optionally be utilized for managing the aspect of the connection.

In one embodiment, managing the connection may include setting a timeout value for the connection. Thus, if the connection is not made prior to an occurrence of the timeout, an attempt to make the connection by the transparent proxy 404 may be terminated. The transparent proxy 404 may optionally detect the timeout for terminating the connection. For example, for each of the network process 406 and the P2P process 410, the associated timeout value may be decreased incrementally for each connection request identified.

In another embodiment, managing the connection may include setting a priority for the connection. Just by way of example, the priority may be higher for connections requested by processes associated with fewer connection requests than for connections requested by processes associated with more connection requests (e.g. the connection requested by the network process 406 may be associated with a higher priority than the connection requested by the P2P process 410. Accordingly, a plurality of connections may be attempted by the transparent proxy 404 in an order based on the priorities associated with such connections.

Figure 5:
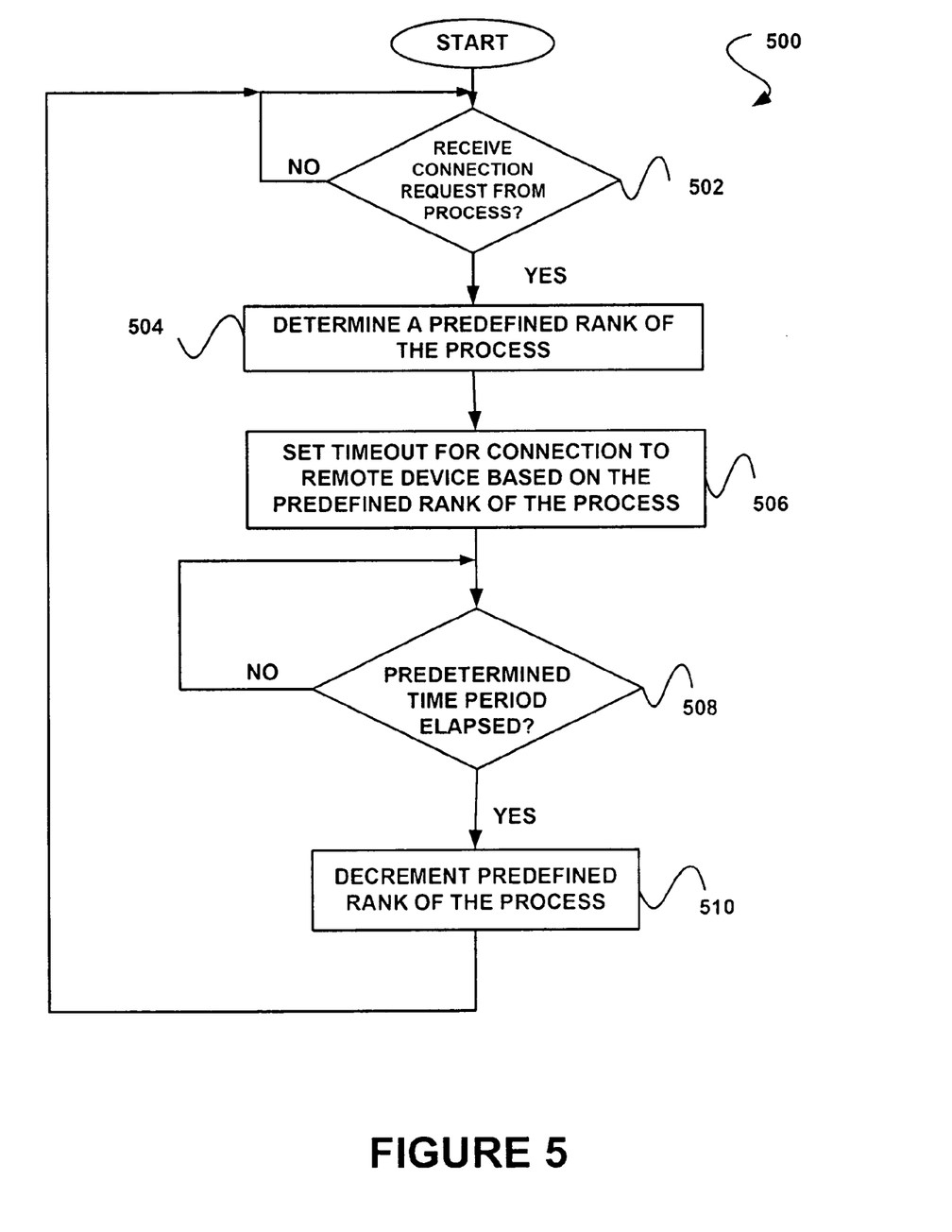
FIG. 5 shows a method for ranking a process, in accordance with still yet another embodiment.

FIG. 5 shows a method 500 for ranking a process, in accordance with still yet another embodiment. As an option, the method 500 may be carried out in the context of the architecture and environment of FIGS. 1-4. Just by way of example, the method 500 may be carried out utilizing the transparent proxy 404 of FIG. 4. Of course, however, the method 500 may be carried out in any desired environment. Again, it should be noted that the aforementioned definitions may apply during the present description.

As shown in decision 502, it is determined whether a connection request is received from a process. In one embodiment, the connection request may be include a request by the process to connect to a remote device. For example, the connection request may be to connect to the remote device over a network.

In another embodiment, the determination may be made by a transparent proxy. Thus, it may be determined whether the connection request is received from the process by the transparent proxy. As an option, the transparent proxy may receive connection requests issued from processes that are destined for the network by intercepting such connection requests.

If it is determined that a connection request has not been received from a process, the method 500 continues to wait for a connection request to be received from a process. If, however, it is determined that a connection request has been received from a process, a predefined rank of the process is determined. Note operation 504. In the context of the present embodiment, the predefined rank may include any rank assigned to the process. Additionally, the predefined rank may be determined, and optionally stored, by the transparent proxy As an option, the predefined rank may be associated with the process based on a behavior of the process. For example, the predefined rank may be based on a number of connection requests received from the process (e.g. within a predetermined time period, etc.). The predefined rank may optionally include a default rank (e.g. '0', etc.) if it is determined that the connection request received from the process (in decision 502) is a first request from the process.

As another option, the predefined rank may reflect a number of connection requests received from the process (e.g. within the predetermined time period, etc.) if it is determined that the connection request received from the process (in decision 502) is not a first request from the process. For example, for each connection request received from the process subsequent to the first connection request, the default value may be incremented. Thus, in one embodiment, the predefined rank may be adjusted in a first direction (e.g. incremented, etc.), in response the connection request received from the process (e.g. if the connection request is not the first connection request).

Further, as shown in operation 506, a timeout for a connection to the remote device is set based on the predefined rank of the process. In the context of the present embodiment, the connection for which the timeout is set may include the connection requested by the process via the connection request. In addition, setting the timeout may include configuring the timeout based on the predefined rank.

In one embodiment, the timeout may be calculated inversely proportionate to the predefined rank. For example, the timeout may include the logarithm of the predefined rank (e.g. timeout=log(predefined rank). Thus, the timeout for the connection of a process associated with a higher predefined rank may be shorter than the timeout for the connection of a process associated with a lower predefined rank.

As an option, the timeout may be utilized for terminating the connection to the remote device. Just by way of example, a time period associated with the timeout may begin to run in response to an attempt to make the connection to the remote device. However, upon occurrence of the timeout (e.g. in response to the time period associated with the timeout ending), the attempt to connect to the remote device may be terminated.

Still yet, it is determined whether a predetermined time period has elapsed, as shown in decision 508. The predetermined time period may be user-configured, as an option. For example, the predetermined time period may include 1 second, 0.1 second, etc.). In one embodiment, it may be determined whether the predetermined time period has elapsed since the timeout for the connection was set (operation 506).

If it is determined that the predetermined time period has not elapsed, the method 500 continues to wait for the predetermined time period to pass. However, if it is determined that the predetermined time period has elapsed, the predefined rank of the process is decremented. Note operation 510. In one embodiment, the predefined rank may be decremented by a predetermined value (e.g. '1'). For example, the predefined rank may be decremented by the same value utilized for incrementing the predefined rank upon receipt of a connection request from the process. To this end, in response to the passing of the predetermined time period, the predefined rank may be adjusted in a second direction different from (e.g. opposite from, etc.) the direction in which the predefined rank is adjusted in response to a connection request.

As an option, the predefined rank may be decremented after each passing of the predetermined time period. Thus, the predefined rank may be decremented after a first instance of the predetermined time period passing, the predefined rank may be decremented again after a second instance of the predetermined period passing, and so forth. As another option, the predefined rank may be decremented until the predefined rank equals the default rank. In this way, each subsequently received connection request may be assigned a timeout value based on the current predetermined rank of the process from which the subsequent connection request is received.

Figure 6:
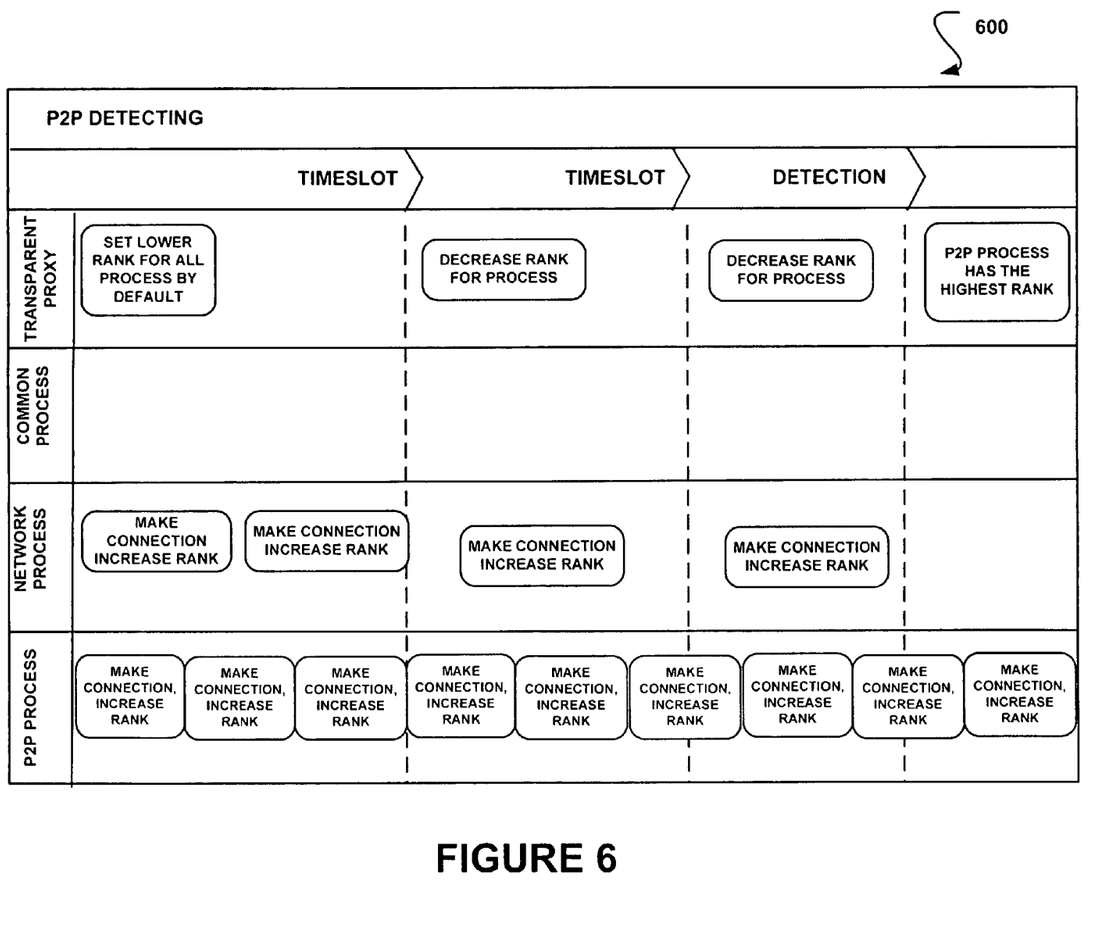
FIG. 6 shows a system for managing connections of various processes utilizing a transparent proxy, in accordance with another embodiment.

FIG. 6 shows a system 600 for managing connections of various processes utilizing a transparent proxy, in accordance with another embodiment. As an option, the system 600 may be implemented in the context of the architecture and environment of FIGS. 1-5. Of course, however, the system 600 may be implemented in any desired environment. Yet again, it should be noted that the aforementioned definitions may apply during the present description.

As shown, during a first predetermined timeslot (e.g. time period), a transparent proxy sets a rank to a default rank for each process from which a first connection request has been received. Thus, for example, the transparent proxy may set the rank for the network process to the default rank in response to receipt of the first connection request from such network process. Similarly, the transparent proxy may set the rank for the P2P process to the default rank in response to receipt of the first connection request from such P2P process.

As also shown, the common process does not issue a connection request to the transparent proxy. For example, the common process may include a process that is not in communication with a network via the transparent proxy. Accordingly, a predefined rank for the common process may not necessarily be set by the transparent proxy.

After each connection request received by the network process and the P2P process, the associated predefined rank is increased (e.g. incremented). Since the P2P process issues more connection requests than the network process (as shown), the predefined rank of the P2P process may ultimately be a higher rank than the predefined rank of the network process.

The predefined rank may be utilized by the transparent proxy for prioritizing connections of the associated processes, in one embodiment. To this end, the transparent proxy may attempt connections based on an associated prioritization. In another embodiment, the predefined rank may be utilized by the transparent proxy for setting a timeout for the connections of the associated processes. In this way, the transparent proxy may terminate connection attempt for which the timeout has occurred.

Furthermore, after each timeslot elapses, the predefined rank for the network process and the P2P process is decreased (e.g. decremented). As an option, the predefined rank for the network process and the P2P process may only be decreased until the predefined rank equals the default rank.

Still yet, after any number of timeslots has elapsed, the transparent proxy may detect processes that exhibit behavior of a P2P process. For example, the transparent proxy may utilize the predetermined ranking for identifying P2P processes (e.g. a ranking above a threshold value may indicate that an associated process is a P2P process, etc.). As an option, the transparent proxy may react based on the detection. The reaction may include notifying an administrator of the process exhibiting the P2P behavior, alerting a device on which the P2P behavior is originating, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product, embodied on a non-transitory computer readable medium, that, when executed, causes a processor to perform a method comprising:
receiving a connection request from an application, at a proxy, wherein the connection request is associated with exchanging data;
setting a rank for the application to a default rank, in response to a determination that the connection request is a first request from the application;
increasing the rank, after each reception of a number of connection requests from the application over a first predetermined time period;
identifying whether the application is a peer-to-peer application at least based on the rank;
determining a priority of a connection of the connection request, at the proxy, at least based on whether the application is the peer-to-peer application;
attempting the connection, at the proxy, in an order at least based on the priority of the connection;
calculating a timeout value for the connection inversely proportionate to the rank, wherein the timeout value is utilized for determining a time period in which the connection is to be attempted; and
decreasing the rank, if a second predetermined time period has elapsed.

2. The computer program product of claim 1, the method further comprising:
determining whether the second predetermined time period has elapsed.

3. The computer program product of claim 1, the method further comprising:
determining whether the connection request is the first request from the application.

4. The computer program product of claim 1, wherein the timeout value is at least based on a logarithm of the rank of the application.

5. The computer program product of claim 1, wherein, if the application is not the peer-to-peer application, the priority of the connection is increased.

6. The computer program product of claim 1, the method further comprising:
alerting a device on which peer-to-peer behavior is originating, based on the ranking exceeding a threshold value.

7. The computer program product of claim 1, the method further comprising:
terminating an attempt to make the connection, in response to the time period ending.

8. The computer program product of claim 1, wherein the rank is only decreased until the rank equals the default rank.

9. A method, comprising:
receiving a connection request from an application, at a proxy that includes a processor and a memory and that is configured to exchange electronic packets in a network environment, wherein the connection request is associated with exchanging data;
setting a rank for the application to a default rank, in response to a determination that the connection request is a first request from the application;
increasing the rank, after each reception of a number of connection requests from the application over a first predetermined time period;
identifying whether the application is a peer-to-peer application at least based on the rank;
determining a priority of a connection of the connection request, at the proxy, at least based on whether the application is the peer-to-peer application;
attempting the connection, at the proxy, in an order at least based on the priority of the connection;
calculating a timeout value for the connection inversely proportionate to the rank, wherein the timeout value is utilized for determining a time period in which the connection is to be attempted; and
decreasing the rank, if a second predetermined time period has elapsed.

10. The method of claim 9, wherein the timeout value is at least based on a logarithm of the rank.

11. The method of claim 9, wherein, if the application is not the peer-to-peer application, the priority of the connection is increased.

12. The method of claim 9, further comprising:
alerting a device on which peer-to-peer behavior is originating, based on the ranking exceeding a threshold value.

13. The method of claim 9, further comprising:
terminating an attempt to make the connection, in response to the time period ending.

14. A system, comprising:
a gateway device configured:
to receive a connection request from an application, wherein the connection request is associated with exchanging data,
to set a rank for the application to a default rank, in response to a determination that the connection request is a first request from the application,
to increase the rank, after each reception of a number of connection requests from the application over a first predetermined time period,
to identify whether the application is a peer-to-peer application at least based on the rank,
to determine a priority of a connection of the connection request at least based on whether the application is the peer-to-peer application,
to attempt the connection in an order at least based on the priority of the connection,
to calculate a timeout value for the connection inversely proportionate to the rank, wherein the timeout value is utilized for determining a time period in which the connection is to be attempted, and
to decrease the rank, if a second predetermined time period has elapsed.

15. The system of claim 14, wherein the gateway device runs the application.

16. The system of claim 14, wherein the timeout value is at least based on a logarithm of the rank.

17. The system of claim 14, wherein, if the application is not the peer-to-peer application, the priority of the connection is increased.

18. The system of claim 14, wherein a device on which peer-to-peer behavior is originating is alerted, based on the ranking exceeding a threshold value.

19. The system of claim 14, wherein the gateway device terminates an attempt to make the connection, in response to the time period ending.

20. The system of claim 14, wherein the rank is only decreased until the rank equals the default rank.

* * * * *